(12) United States Patent
Heintzeman et al.

(10) Patent No.: US 6,631,355 B1
(45) Date of Patent: Oct. 7, 2003

(54) SYSTEM AND METHOD FOR AWARDING CREDITS TO PERSONS WHO BOOK TRAVEL-RELATED RESERVATIONS

(75) Inventors: Scott B. Heintzeman, Plymouth, MN (US); Thomas W. Storey, Minneapolis, MN (US); Barbara Monson, Oceanside, CA (US); Steven J. Medina, San Diego, CA (US); Gregory A. Malark, Maple Grove, MN (US)

(73) Assignee: Radisson Hotels International, Inc., Minneapolis, MN (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/892,563

(22) Filed: Jul. 14, 1997

Related U.S. Application Data

(63) Continuation of application No. 08/439,626, filed on May 12, 1995, now abandoned, which is a continuation of application No. 08/385,381, filed on Feb. 7, 1995, now Pat. No. 5,483,444, which is a continuation of application No. 08/143,453, filed on Oct. 26, 1993, now abandoned.

(51) Int. Cl.[7] .............................................. G06F 17/60
(52) U.S. Cl. ............................................. 705/14; 705/5
(58) Field of Search ............................ 705/1, 14, 7, 5, 705/10; 235/379, 380

(56) References Cited

U.S. PATENT DOCUMENTS

| | | | |
|---|---|---|---|
| 4,750,119 A | 6/1988 | Cohen et al. | 395/201 |
| 4,833,607 A | 5/1989 | Dethloff et al. | 395/201 |
| 4,885,685 A | 12/1989 | Wolfberg et al. | 395/201 |
| 5,025,372 A | 6/1991 | Burton et al. | 395/201 |
| 5,056,019 A | 10/1991 | Schultz et al. | 395/201 |
| 5,202,826 A | 4/1993 | McCarthy | 395/201 |
| 5,237,499 A | 8/1993 | Garback | 395/201 |
| 5,239,460 A | 8/1993 | LaRoche | 395/201 |
| 5,297,026 A | 3/1994 | Hoffman | 395/201 |

FOREIGN PATENT DOCUMENTS

| | | |
|---|---|---|
| EP | 0 308 224 | 3/1989 |
| GB | 1 565 286 | 4/1980 |
| WO | 93/12489 | 6/1993 |

OTHER PUBLICATIONS

Business Travel, "A new way to Purchase Travel", Business Travel News, Issue 158, Nov. 6, 1989.*

(List continued on next page.)

*Primary Examiner*—Frantzy Poinvil
(74) *Attorney, Agent, or Firm*—Merchant & Gould P.C.

(57) ABSTRACT

A computerized system provides incentives for travel agents and similar persons to book particular travel-related reservations. The system achieves this by awarding cumulative credits to travel agents based upon bookings of travel-related reservations. The system receives a booking format which identifies a travel-related reservation. The system further receives a code which identifies a travel agent or other person who entered the travel-related reservation. Upon receiving the travel-related reservation, the system assigns cumulative credits to the travel agent identified by the code based upon the travel-related reservation. Travel agents can thus build up credits over time based upon their bookings of travel-related reservations and use those credits to receive a particular award or prize.

43 Claims, 7 Drawing Sheets

OTHER PUBLICATIONS

Radisson Hotels International Press Release, *Radisson Hotels International and Visa U.S.A. Unveil World's First On–Line Frequency Program for Travel Agents*, Sep. 22, 1992.
*A Page From Curt's Book*, St. Paul Pioneer Press, Sep. 25, 1992.
Jennifer Dorsey, *Radisson Officials to Call on Agencies, Launch Incentive Plan*, Travel Weekly, Sep. 28, 1992.
David Phelps, *A Little Incentive*, Star Tribune, Minneapolis, Minnesota, Sep. 28, 1992.
*Radisson Hotels International and Visa U.S.A. Unveil World's First On–Line Frequency Program for Travel Agents*, PR Newswire, Sep. 22, 1992.
Affidavit of Mark W. Bassinger, pp. 1–7 (May 15, 1997).
Radisson inter–office communication regarding Travel Agency Frequency Program, 1 page (Oct. 2, 1992).
Radisson inter–office communication regarding Radisson/Visa World of Winners Sweepstakes, 1 page (Jul. 12, 1990).
Radisson Hotels International World of Winners Sweepstakes Official Rules. 3 pages (Jun. 27, 1990).
Sorum, E. et al., "Travel Agent Frequency Program", pp. 1–12 (Jun. 30, 1992).
Radisson inter–office communication regarding ROI for WOW/TA Frequency, 1 page (Aug. 14, 1992).
Deposition of Scott Heintzeman, 9 pages (Jan. 16, 1996).
Deposition of Thomas William Storey, 8 pages (Dec. 10, 1996).
Communication from Tom Storey, 2 pages (Sep. 22, 1992).
Deposition of Lance L. Vietzke, 4 pages (May 13, 1997).
Tom Polski Script Radisson News Conference 1992 ASTA World Congress, Cairo, Egypt, 3 pages (Sep. 22, 1992).
Radisson Inter–office communication regarding BI Feedback on Visa Program. 1 page (Aug. 14, 1992).
Radisson Announcement Letter, 1 page (Oct. 1992).
Radisson inter–office communication regarding TA Sales Blitz—Sep. 1, 1992 Meeting Recap. 3 pages (Sep. 3, 1992).
ASTA Marketing Services letter, 1 page (Oct. 2, 1992).
Memorandum regarding T.A. Frequency Program, 3 pages (Sep. 29, 1992).
Radisson inter–office communication regarding Look to Book—Australia, 1 page (Oct. 15, 1992).
Various newspaper articles based on news release, 8 pages (1992).
Radisson Inter–office communication regarding Sales Blitz for T.A. Frequency Launch, 1 page (Aug. 4, 1992).
Radisson Inter–office communication regarding TA Frequency Program Update, 1 page (Sep. 8, 1992).
Look to Book announcement, 1 page (Oct. 1992).
Radisson inter–office communication regarding TA Frequency Update Meeting—Oct. 7, 2 pages (Oct. 7, 1992).
Spreadsheet from Radisson: Travel Agent Promotion—Quarter IV 1992, 1 page (1992).
Radisson inter–office communication regarding Travel Agency Sales Call List, 1 page (Oct. 21, 1992).
Deposition of Maureen A. O'Hanlon, 2 pages (Feb. 7, 1997).
Deposition of Julie Wilcox, 3 pages (Feb. 27, 1997).
Radisson "Look to Book" Frequency Program Announcement Video—Part One, 8 pages (Sep. 2, 1992).
Radisson inter–office communication from Tom Storey, 1 page (Date Unknown).
Letter from Thomas W. Storey to Adam Aron, 9 pages (Sep. 16, 1992).
Radisson inter–office communication regarding TA Frequency Program, 3 pages (Aug. 21, 1992).
Radisson inter–office communication regarding AVIS, 1 page (Sep. 17, 1992).
Letter from Kevin J. Danaher to Jeri Jo Poshkoff, 1 page (Sep. 17, 1992).
Radisson inter–office communication regarding TA Frequency—Communications Plan, 2 pages (Oct. 5, 1992).
Radisson inter–office communication regarding TA Frequency—800# Training, 1 page (Oct. 9, 1992).
Trade Advertisement, 2 pages (Date Unknown).
Trademark Application for the mark Look To Book & Design, 6 pages (Feb. 9, 1993).
Radisson inter–office communication regarding TA Frequency Program Update, 5 pages (Sep. 8, 1992).
Affidavit of Jennifer Riesselman, 13 pages (Jun. 12, 1997).
Deposition of Scott Heintzeman, 17 pages (Jan. 15, 1997).
Deposition of Gregory A. Malark, 9 pages (Dec. 16, 1996).
Deposition of Barbara Eileen Monson, 13 pages (Nov. 14, 1996).
Deposition of Ellen M. Sorum, 2 pages (Feb. 10, 1997).
Deposition of Thomas William Storey, 17 pages (Dec. 10, 1996).
Affidavit of Maureen O'Hanlon and Exhibits C,D,E, and F, 29 pages (Jun. 16, 1997).
Radisson inter–office communication regarding TA Frequency Program, 2 pages (Jul. 10, 1992).
Radisson inter–office communication regarding TA Frequency Program Bid Specs, 6 pages (Jul. 10, 1992).
Letter from Thomas W. Storey to Lloyd Brooks, 1 page (Aug. 7, 1992).
Request for Certificate of Correction filed with the Trademark Office, 6 pages (Jun. 11, 1997).
Affidavit of Elizabeth A. Kimber and Exhibits A, B, C, D, E, F, and G, 17 pages (Jun. 27, 1997).
BI inter–office communication regarding Recap of the Radisson Client Visit of Sep. 9, 1992, 4 pages (Sep. 11, 1992).
BI inter–office communication regarding Recap of the Radisson Sep. 22, 1992 Meeting, 6 pages (Sep. 24, 1992).
Affidavit of Thomas Carmody, 6 pages (Aug. 27, 1997).
Copy of the Travel Agent Performance Program for Budget Rent–A–Car as Presented by Business Incentives, 12 pages (Jun. 7, 1991).
Copy of the Travel Agent Performance Program for Hyatt Hotels & Resorts as Presented by BI, 31 pages (Nov. 26, 1991).
Copy of Appointment Calendar Aug. 1990 through Nov. 1991 with handwritten notations, 32 pages Begins Aug. 1, 1990.
Letter from Guy Schoenecker to Thomas Storey regarding BI's "Non–Disclosure Clause", 1 page (Jul. 9, 1992).
Letter from Larry Schoenecker to Thomas W. Storey requesting signed authorization, 1 page (Sep. 15, 1992).
Affidavit of Kathy K. Todd; 3 pages (Jun. 28, 1997).
Copies of pages from vol. I of the deposition of Joseph C. Jenniges. 27 photo reduced pages onto 5 pages (Sep. 24, 1996).

* cited by examiner

```
1 HHL RD SS1 XXX 01NOV-02NOV  1NT 16041  RADISSON TEST HOTEL  ← 100
1CORRAC -1/RT-USD89.00/AGT98010021  ← 102
/NM-TEST TEST
/RG-8900USD
/CF-R4760026
ACCEPTED /GTD 6P HLD              CXL-SEE POLICY
CORP TEST U ROOM
YOU COULD HAVE EARNED 890 POINTS WITH THIS
RESERVATION. TO PROPERLY ENROLL SEE: HODRD/INCE *  ← 104
>
```

*Fig. 6*

```
1 HHL RD SS1 XXX 20NOV-21NOV  1NT 16041  RADISSON TEST HOTEL  ← 100
1CORRAC -1/RT-USD89.00/AGT98010021/SI-RD-TSWRIGHT  ← 102
/NM-TEST TEST                    ↑
/RG-8900USD                     110
/CF-R4760077
ACCEPTED /GTD 6P HLD              CXL-SEE POLICY
CORP TEST U ROOM
SUCCESSFUL ENROLLMENT. THIS BOOKING EARNS YOUR
FIRST 890 PENDING POINTS IN LOOK TO BOOK. *  ← 106
>
```

*Fig. 7*

```
1 HHL RD SS1 XXX 20NOV-21NOV  1NT 16041  RADISSON TEST HOTEL  ← 100
1CORRAC -1/RT-USD89.00/AGT98010021/SI-RD-BSKROGER  ← 102
/NM-TEST TEST                    ↑
/RG-8900USD                     110
/CF-R4760061
ACCEPTED /GTD 6P HLD              CXL-SEE POLICY
CORP TEST U ROOM
THIS BOOKING WILL EARN YOU 890 PENDING POINTS.
YOU HAVE 0 REDEEMABLE POINTS IN YOUR ACCOUNT. *  ← 108
>
```

*Fig. 8*

V2345678/2345678-9
RGSMITH
TRAVEL ANYWHERE
123 MAIN STREET
CHICAGO, IL 60610

| ACTIVITY DATES | |
|---|---|
| AVAILABLE REDEEMABLE POINTS | 2,500 |

| BULLETIN BOARD |
|---|
|  |

| TRANSACTION DATE | CURRENT ACTIVITY: BOOKING AND REDEMPTION INFORMATION | PENDING POINTS | REDEEMABLE POINTS |
|---|---|---|---|
| 10/01/92 | BALANCE FORWARD | 0 | 0 |
| 10/05/92 | NEW BOOKING R3456217 - DEPART DATE 11/15/92 | 2,500 | |
| 10/05/92 | EDWARDIAN BONUS R3456217 - | 500 | |
| 10/30/92 | NEW BOOKING R7324598 - DEPART DATE 12/26/92 | 1,000 | |
| 11/03/92 | NEW BOOKING R2476923 - DEPART DATE 03/08/93 | 500 | |
| 11/03/92 | MODIFY BOOKING R4736590 - DEPART DATE 03/05/93 | -100 | |
| 11/25/92 | CONFIRMED TRAVEL R3456217 | -2,500 | 2,500 |
| | TOTAL | 1,900 | 2,500 |

*Fig. 9*

SYSTEM AND METHOD FOR AWARDING CREDITS TO PERSONS WHO BOOK TRAVEL-RELATED RESERVATIONS

This is a Continuation of application Ser. No. 08/439,626, filed May 12, 1995 now abandonned which is a continuation of Ser. No. 08/385,381 now U.S. Pat. No. 5,483,444 filed Feb. 7, 1995, which is a continuation of 08/143,453 filed Oct. 26, 1993 now abandonned.

FIELD OF THE INVENTION

The present invention relates to a system for providing incentives to persons who book travel-related reservations by awarding credits to those persons based upon the travel-related reservations.

BACKGROUND OF THE INVENTION

Travel agents and similar persons book most travel-related reservations. As an example, consider hotel reservations. Many customers book hotel reservations through a travel agent when the customer, for example, reserves airline tickets. Travel agents have a certain amount of discretion to recommend various hotels to travelers. Therefore, hotel companies have a strong interest in providing incentives for travel agents to recommend their hotels.

An incentives system that provides rewards to travel agents on a random basis is the World of Winners sweepstakes program, developed by Radisson Hotels International, Inc., the assignee of the present application. In the World of Winners sweepstakes program, for example, every tenth reservation booked in a particular hotel results in the travel agent receiving a reward or prize. The random nature of the World of Winners sweepstakes programs, however, reduces the incentive of travel agents to book travel-related reservations for particular hotels. When participating in such programs, travel agents do not know with certainty whether booking a hotel reservation for a particular hotel will result in an award.

Some systems have provided incentives to travel agencies based on booked reservations. These systems, however, do not necessarily provide personal incentives to individual travel agents, since the systems are not on-line and the agency itself receives any awards or prizes based on booked reservations. Companies providing travel services thus do not necessarily gain significant benefits from these programs, since the individual travel agents have much discretion in making reservations and are not necessarily motivated by incentives and awards for the agency.

Therefore, a need exists for a system which provides incentives for travel agents and similar persons to book particular travel-related reservations by awarding cumulative credits to those travel agents based upon the bookings.

SUMMARY OF THE INVENTION

A computerized awards credits to persons who book travel-related reservations. The system receives a booking format which includes a plurality of fields. At least one of the fields includes information identifying a travel-related reservation. The system further transmits a code which identifies a person who created or initiated the travel-related reservation. Upon receiving the travel-related reservation, the system cumulatively assigns credits to the person identified by the code based upon the travel-related reservation. Therefore, persons who enter travel-related reservations may build up credits over time and use those credits to receive a particular incentive such as an award or prize.

The computerized method can also verify the credits according to predefined criteria, classify the credits as pending or redeemable, provide on-line feedback regarding credits which could have been assigned if the person did not elect to receive credits, or automatically provide an indication of incremental credits assigned for a travel-related reservation.

BRIEF DESCRIPTION OF THE DRAWINGS

FIG. 6 is an example of a user interface, showing an "unsuccessful enrollment" message, for a system that implements the present invention.

FIG. 7 is an example of a user interface, showing a "successful enrollment" message, for a system that implements the present invention.

FIG. 8 is an example of a user interface, showing a message for credits earned following enrollment, for a system that implements the present invention.

FIG. 9 is an example of a hard copy report of credits awarded to a travel agent.

DETAILED DESCRIPTION OF THE PREFERRED EMBODIMENT

Figure 1:
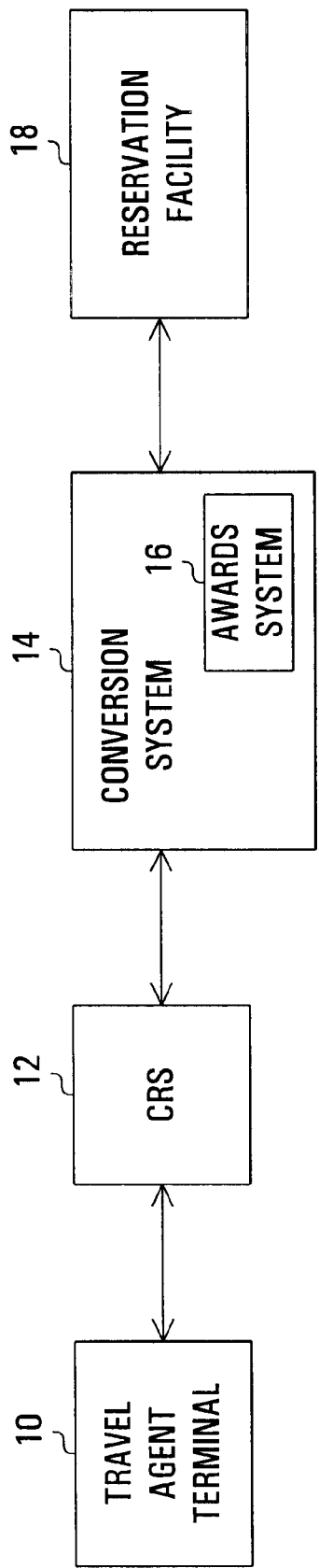
FIG. 1 is a block diagram illustrating how a system which implements the present invention typically interfaces with a reservation system.

In the following detailed description of the preferred embodiment, reference is made to the accompanying drawings which form a part hereof and in which is shown by way of illustration a specific embodiment in which the invention may be practiced. This embodiment is described in sufficient detail to enable those skilled in the art to practice the invention, and it is to be understood that other embodiments may be utilized and that structural or logical changes may be made without departing from the scope of the present invention. The following detailed description is, therefore, not to be taken in a limiting sense, and the scope of the present invention is defined by the appended claims.

Overview

The present invention is an awards system that provides incentives to travel agents or other persons who book travel-related reservations. The system typically interacts with a travel agent on-line to assign credits for travel-related reservations and thus provide the travel agent with immediate feedback regarding the credits earned. A travel agent can continually earn credits during a period of time. Each credit earned by the travel agent is added into a cumulative total number of credits for the travel agent.

Therefore, the travel agent can "build up" credits over time and then "cash in" the credits for an award. The available awards are typically structured so that, as the value of the award increases, more credits are required to earn the award. An award offered to a travel agent may include, for example, a free stay at an hotel or a free travel package. The present invention thus provides incentives for travel agents to repeatedly book particular travel-related reservations, which can significantly increase bookings for those companies which provide the awards.

A key to making the present invention commercially viable involves determining how to implement the invention. Since most travel agents work through reservation systems (described below) that are already established, implementing such a system involves determining how to interact with the existing reservation systems.

A commercial system which has achieved a successful implementation of the present invention is the LOOK TO BOOK travel agent incentives program, developed by Radisson Hotels International, Inc. (hereinafter Radisson), the assignee of the present application. The incentives which the LOOK TO BOOK program provides to travel agents, and the corresponding increase in travel-related reservations, are evident from the following statistics. After introduction of the LOOK TO BOOK program by Radisson, travel agents began immediately enrolling in the program at a rate of approximately 350 travel agents per day. As of October 1993, approximately 52,000 travel agents have enrolled in the LOOK TO BOOK program, which is about one-sixth of the world's population of automated travel agents. Furthermore, travel agent bookings for Radisson have increased by approximately 60% following introduction of the LOOK TO BOOK program. This has occurred without any particular change in advertising or other marketing efforts for Radisson. A travel agent research project conducted for Radisson by a local university showed that travel agents were much more willing to book Radisson Hotels because of the LOOK TO BOOK program.

Travel Reservations Network

FIG. 1 is a block diagram showing how a system which implements the present invention typically interfaces with a reservation system. A travel agent uses a terminal 10 to enter a travel-related reservation. The present application describes the invention with respect to a travel agent reservation system for illustrative purposes. Persons other than travel agents may also enter travel-related reservations. Travel-related reservations include, for example, reservations for the following: cruise ships; car rental; lodging; theater; travel insurance; airline tickets; and trains.

A travel agent terminal 10 transmits the travel-related reservation to a computerized reservation system 12. Computerized Reservation Systems (CRS) are well known in the art and include, for example, CRS's known by the following trademarks and companies: AMADEUS; SABRE; WORLDSPAN; SYSTEM ONE; APOLLO; GEMINI; GALILEO; and AXESS.

A CRS allows a travel agent or other person to enter a travel-related reservation in a particular availability format. An availability format depends on the type of CRS used and typically comprises a plurality of fields joined together to form a database element. An availability format may include, for example, fields for the following information: rate availability; hotel chain code; city code; arrival date; checkout date; number of nights; category code; action code; and all rates. An example of an availability format is shown on line 100 in FIG. 6.

A conversion system 14 receives an availability format, which identifies a travel-related reservation, from CRS 12. Conversion system 14 then converts the travel-related reservation contained within an availability format into a standard booking format. An example of a conversion system is the PIERRE computer system, developed by Radisson, the assignee of the present application. Therefore, regardless of which CRS 12 a travel agent uses, conversion system 14 preferably converts availability formats into a standardized booking format. An example of a booking format is shown on line 102 in FIG. 6. In addition to receiving travel-related reservations from a travel agent terminal, via a CRS, awards system 16 can also receive travel-related reservations from other sources, such as the following examples: a phone (modem) link; an automatic teller machine; a kiosk, and an interactive television system.

Conversion system 14 can then transmit a booking format to a particular reservation facility 18. Reservation facility 18 may include, for example, a particular hotel, cruise ship line, or car rental company identified by a travel-related reservation contained within a booking format.

Awards System

The present invention is preferably implemented by an awards system 16 which interacts with conversion system 14, as shown in FIG. 1. Awards system 16 receives information regarding travel-related reservations from conversion system 14 and awards credits (also referred to as "points") to travel agents or other persons who book the travel-related reservations.

Figure 2:
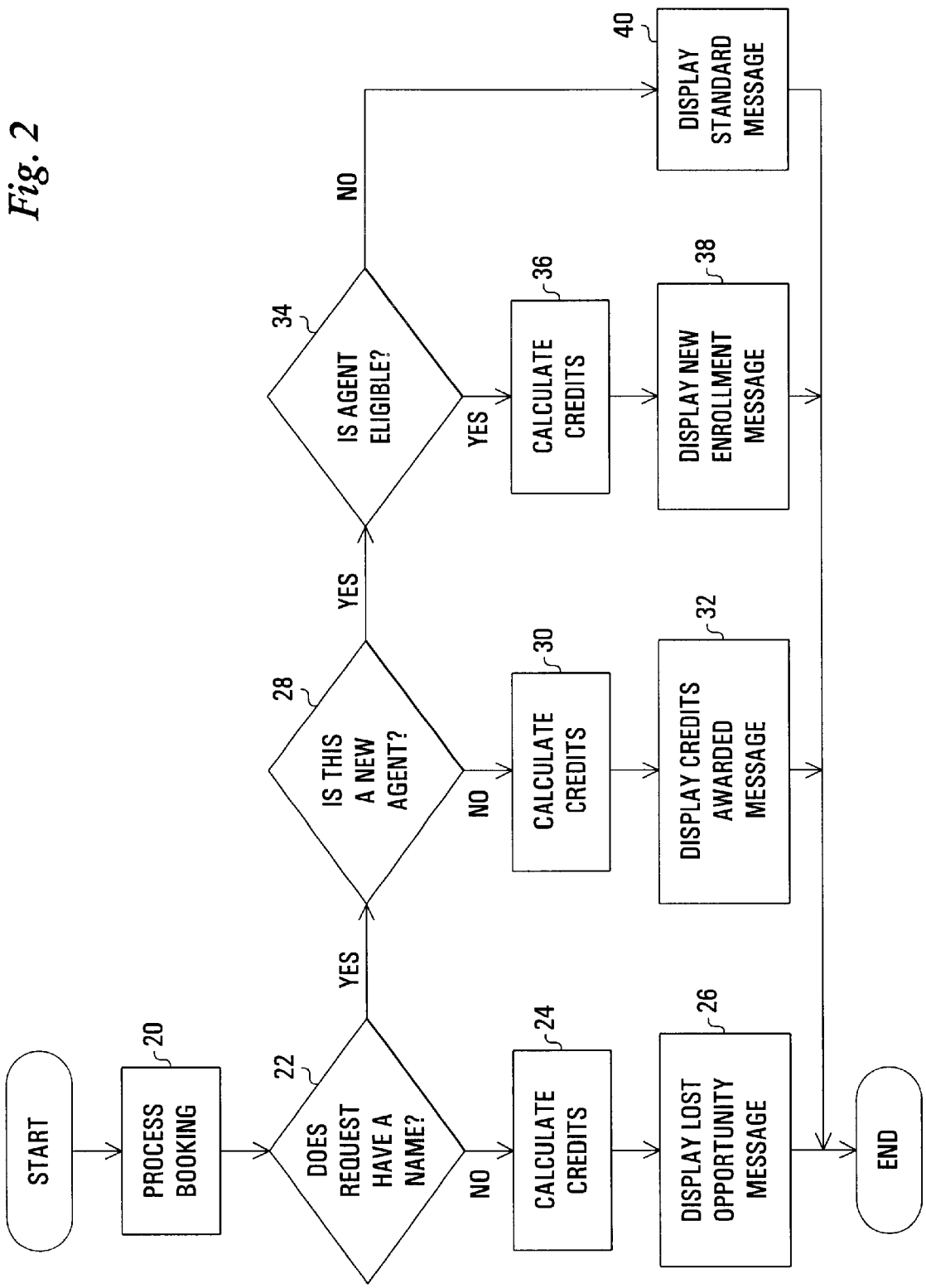
FIG. 2 is a flow chart of a booking process.

FIG. 2 is a flow chart showing a booking process, which is typically a main processing loop, of awards system 16. Awards system 16 typically first processes a booking format at step 20. At step 22, awards system 16 checks the booking format for an identification of a travel agent or other person who entered the travel-related reservation. If the booking format does not have such an identification, awards system 16 then calculates credits which would have otherwise been assigned to the person (step 24) and then displays a message (step 26) to the person at terminal 10, indicating the number of credits which were lost by the individual. An example of a user interface for this transaction is shown in FIG. 6. Lines 104 in FIG. 6 show an example of an "unsuccessful enrollment" message.

If the booking format includes an identification, awards system 16 checks to determine if the identification is a new travel agent not already within a database for awards system 16 (step 28). Awards system 16 typically receives an identification of a travel agent or other person from one of the fields of a booking format. For example, a travel agent can enter a character string identification into a special instruction (SI) field 110 (see FIG. 7) of a booking format. In the example shown, the character string comprises the first initial, middle initial, and last name of the travel agent. Other character strings or codes may be used as an identification of the travel agent or other person who made the booking. Alternatively, awards system 16 may receive an identification from a log-in identifier corresponding to a travel agent or other person. In some systems which may interface awards system 16, a person who enters bookings must log on to the system with an identifier. Therefore, awards system 16 can receive such a log-in identifier and will not require a separate identification of the travel agent or other person.

If the identification is not a new travel agent, awards system 16 then calculates the credits (step 30) and displays the credits awarded (step 32) to the travel agent, along with a corresponding message. An example of a user interface for this transaction is shown in FIG. 8. Lines 108 in FIG. 8 show an example of a message for indicating the number of credits awarded. The "0" redeemable credits shown in lines 108 of FIG. 8 preferably becomes incremented with each booking to show a cumulative credits awarded to the corresponding travel agent or similar person. Awards system 16 preferably stores cumulative credits, as shown displayed in FIG. 8, from one booking to the next so that awards system 16 can increment or decrement total credits as new booking are made. In addition to displaying credits or points awarded directly on-line to a travel agent, as shown in FIG. 8, awards system 16 can "park" such information in the background so that credits awarded information is accessible to a travel agent via a terminal.

Otherwise, awards system 16 determines at step 34 if the travel agent is eligible for the program. If the travel agent is not eligible, awards system 16 displays a standard message at step 40, such as lines 104 in FIG. 6. If the travel agent is eligible, awards system 16 then calculates the credits (step 36) and displays a new enrollment message (step 38). An example of an interface for this transaction is shown in FIG. 7. Lines 106 in FIG. 7 show an example of a "new enrollment" message.

Figure 3:
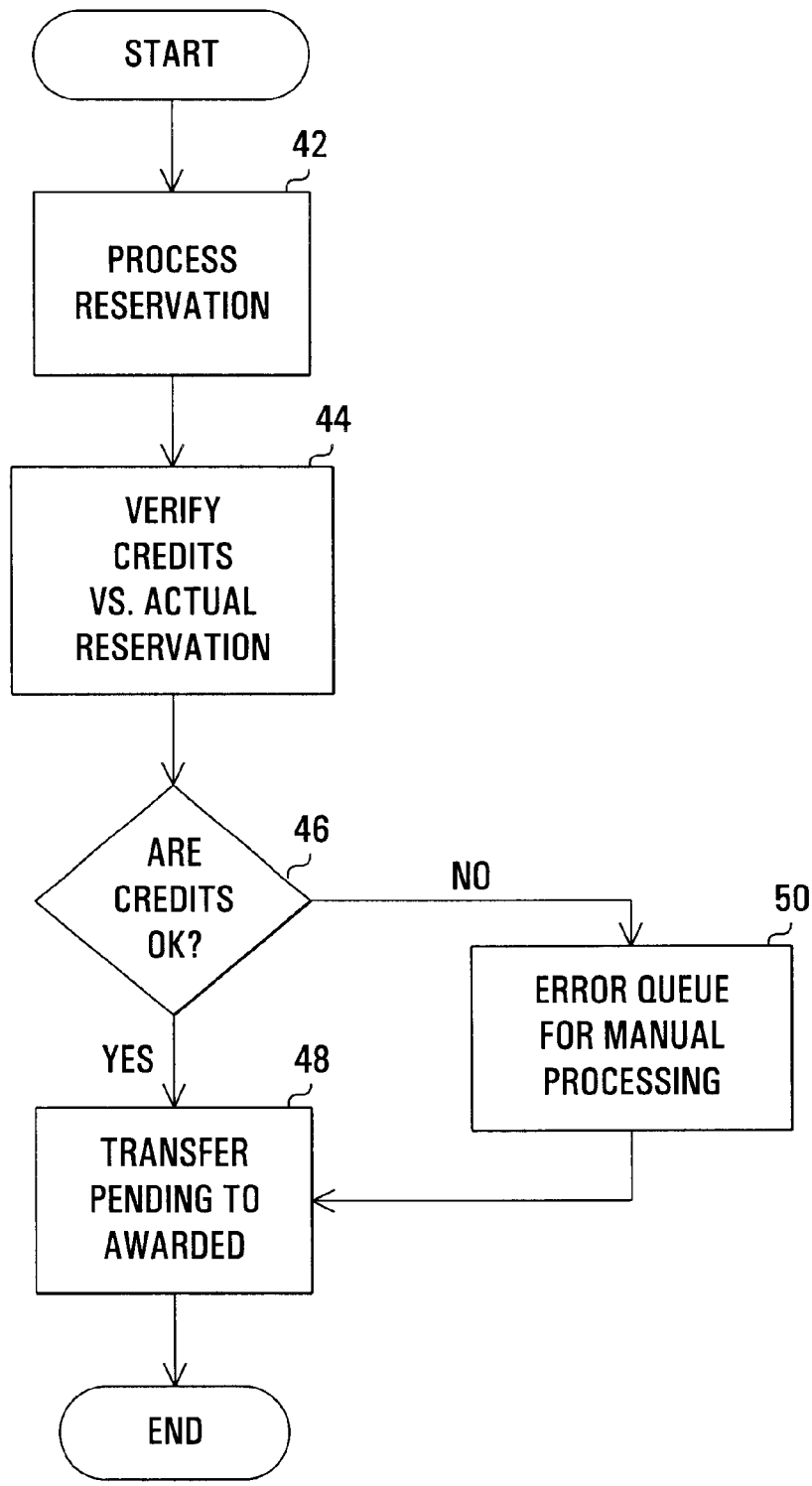
FIG. 3 is a flow chart of a process for awarding credits.

FIG. 3 is a flow chart of a process for awarding or assigning credits. At step 42, awards system 16 begins processing a travel-related reservation. Awards system 16 verifies the credits-with the actual travel-related reservation at step 44. Verification is performed to prevent fraud and to ensure that the credits are issued for a travel-related reservation which was actually used by a customer requesting the reservation. When awards system 16 initially assigns credits, those credits are typically classified as "pending" until awards system 16 performs a verification process. A travel agent preferably may not "cash in" credits while the credits are classified as pending. If awards system 16 determines in the verification that the credits comply with the actual reservation (step 46), then awards system 16 converts the credits from pending to redeemable or spendable at step 48. Otherwise, awards system 16 typically transfers the credits to an error queue at step 50 for manual processing.

A verification of the credits is typically based upon both an event and time. For example, with respect to hotel reservations, awards system 16 typically waits until a customer who requested the hotel reservation checks out of the corresponding hotel. Subsequently, awards system 16 typically waits for a predetermined period of time, such as ten days, to verify that the customer indeed used the hotel reservation. Finally, after the waiting period, awards system 16 converts the pending credits to redeemable credits. Alternatively, verification may be based solely upon either an event or time.

Figure 4:
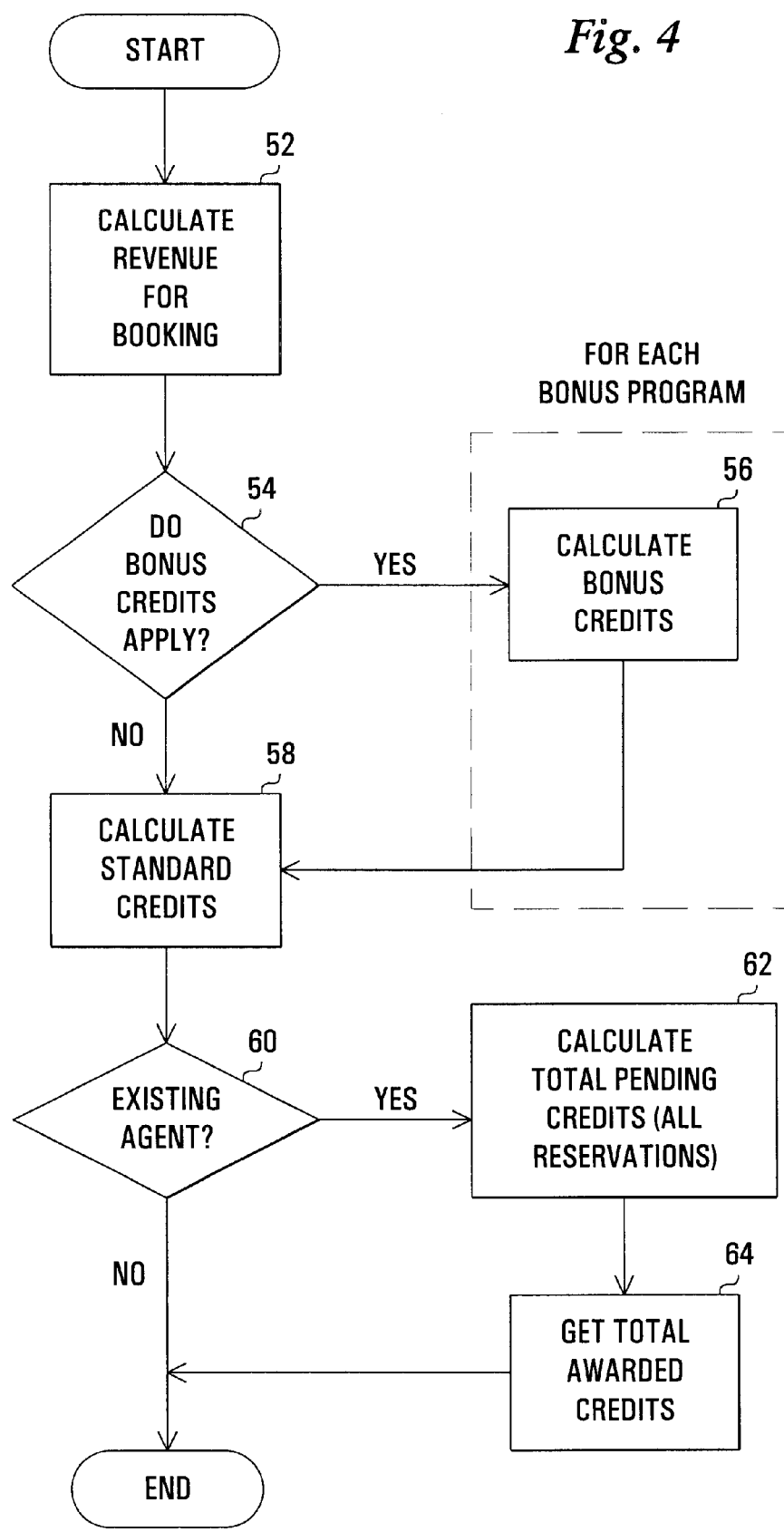
FIG. 4 is a flow chart of a process for calculating credits.

FIG. 4 is a flow chart of a process for calculating credits. Awards system 16 typically awards credits based upon the revenue for a particular travel-related reservation booking, which occurs at step 52. Other types of calculations for credits are possible. For example, awards system. 16 may simply award a predetermined number of credits for any particular booking. For lodging reservations, awards system 16 may, for example, award credits based on how many nights of lodging a customer has requested. At step 54, awards system 16 determines whether bonus credits apply. Bonus credits supply additional incentives to the travel agents by increasing the number of credits that the travel agent may receive for a particular booking. If bonus credits apply, awards system 16 then calculates the bonus credits at step 56 for each particular bonus program. Awards system 16 also calculates the standard credits available for the booking (step 58).

Awards system 16 uses bonus programs to award additional credits to a travel agent based upon a predetermined activity in conjunction with a booking. Examples of predetermined activities, which may increase credits awarded, include the following: a product booked by a travel agent (for example, a travel package); lodging booked by a travel agent (for example, a type of hotel); when a travel agent books the travel-related reservation; when a customer who requested the travel-related reservation uses the travel-related reservation; how a customer pays for the travel-related reservation (for example, using a particular type of credit card); how a customer guarantees the travel-related reservation; a class of a customer (for example, age); or a class of a travel agent (for example, travel agent credit level or group affiliation).

At step 60, awards system 16 determines whether the travel agent who entered the reservation is a new travel agent or a travel agent already within a database for awards system 16. If the travel agent is already in a database, awards system 16 calculates the total pending credits at step 62 and then retrieves the total redeemable credits for the corresponding travel agent at step 64. Awards system 16 also preferably modifies cumulative credits as bookings are adjusted or cancelled.

Figure 5:
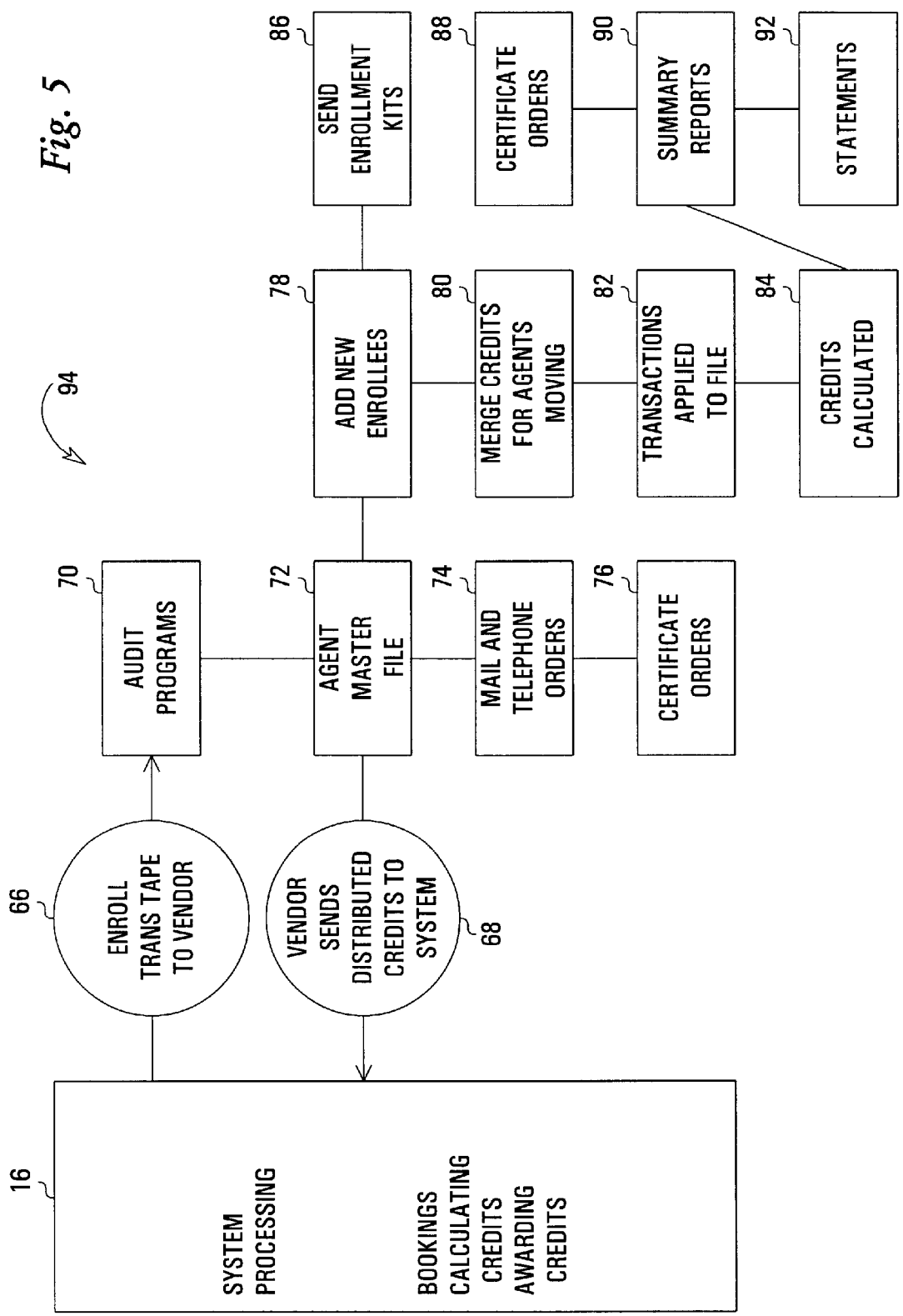
FIG. 5 is a block diagram of a system which administrates credits and awarding of prizes.

FIG. 5 is a block diagram showing how awards system 16 interfaces with an administrative system 94 for administrating and awarding prizes based upon the credits. In addition to on-line reporting of credits through CRS's, awards system 16 may also generate printed documents reporting credits via system 94. An example of a hard copy report of credits is shown in FIG. 9.

Periodically, typically every 30 days, awards system 16 transmits a storage medium (step 66) which includes information related to processing within awards system 16. A storage medium may be transmitted to an outside vendor or, alternatively, functions of administrative system 94 may be performed by awards system 16. Submodule 70 receives the information and performs audit programs on the data. A travel agent master file 72 preferably maintains a database of the travel agents stored within awards system 16 and the corresponding credits awarded to the travel agents. File 72 also preferably maintains identifiers for agencies which engage the travel agents, which may be work addresses for travel agents. Submodule 78 adds new travel agents to the master file. Submodule 86 performs the function of sending enrollment kits to the new enrollees, which includes information on the program and rules for receiving prizes and awards based upon credits earned.

Submodule 74 receives and processes mail and telephone orders. Submodule 76 receives certificate orders. A travel agent typically submits an order for the purpose of redeeming earned credits for an award or prize. Submodule 80 updates the database for new addresses of enrollees. Submodule 82 updates the master file with new credits awarded, based upon credits calculated by submodule 84. Submodule 90 generates summary reports of credits and, based upon this information, submodule 92 generates statements of credits for reporting to travel agents. These statements are then typically mailed to participating travel agents in order to report their credits. At step 68, system 94 periodically, typically every 30 days, sends updated information to awards systems 16.

While the present invention has been described in connection with the preferred embodiment thereof, it will be understood that many modifications will be readily apparent to those skilled in the art, and this application is intended to cover any adaptations or variations thereof. It is manifestly intended that this invention be limited only by the claims and equivalents thereof.

What is claimed is:

1. A computerized method for cumulatively assigning credits to persons who book travel-related reservations for use in receiving prizes or awards, comprising the steps executed by a computer of:

a) receiving a booking which includes information identifying a travel-related reservation, and an identification of a person who booked the travel-related reservation, and detecting events related to the travel-related reservation to control conversion of credits;

b) cumulatively assigning credits to the person who booked the travel-related reservation based upon the travel-related reservation; and c) classifying the credits as pending credits, which are not redeemable for a prize or award, and subsequently converting the pending credits to redeemable credits, which are redeemable for a prize or award, if the method verifies through the receiving step that the pending credits are eligible for conversion to the redeemable credits based on the detecting step detecting the events.

2. The method of claim 1 wherein the classifying step further comprises the step executed by the computer of classifying the credits as the pending credits until a predetermined event occurs, as detected by the receiving step, and converting the pending credits to the redeemable credits after the occurrence of the event.

3. The method of claim 1 wherein the classifying step further comprises the step executed by the computer of classifying the credits as the pending credits for a predetermined amount of time, as detected by the receiving step, after the assignment of the credits and converting the pending credits to the redeemable credits after the predetermined amount of time.

4. The method of claim 1 wherein the classifying step further comprises the steps executed by the computer of:
a) classifying the credits as the pending credits until a predetermined event occurs as detected by the receiving step; and
b) maintaining the credits as the pending credits for a predetermined amount of time, as detected by the receiving step, after the occurrence of the event and converting the pending credits to the redeemable credits after the predetermined amount of time.

5. The method of claim 1 wherein the receiving step comprises the step of receiving the booking and the identification of the person from a computerized reservation system.

6. The method of claim 1 wherein the receiving step comprises the step of receiving the booking the identification of the person from a modem connection.

7. The method of claim 1 wherein the receiving step comprises the step of receiving as the identification of the person a log-in identifier related to the person.

8. The method of claim 1, further comprising the step executed by the computer of reporting a total number of the credits assigned to the person.

9. The method of claim 8 wherein the reporting step comprises the step of reporting on-line the total number of the credits assigned to the person.

10. The method of claim 8 wherein the reporting step comprises the step of reporting in a hard copy format the total number of the credits assigned to the person.

11. The method of claim 8 wherein the reporting step comprises the step of reporting a cumulative total of the pending credits assigned to the person.

12. The method of claim 8 wherein the reporting step comprises the step of reporting a cumulative total of the redeemable credits assigned to the person.

13. The method of claim 1 wherein the assigning step comprises the step of assigning the credits to the person based upon a monetary value of the travel-related reservation.

14. The method of claim 1 wherein the assigning step comprises the step of displaying on-line an identification of whether the person has previously received credits.

15. The method of claim 1 wherein the assigning step comprises the step of assigning bonus credits, comprising additional credits, to the person based upon a predetermined activity in conjunction with the travel-related reservation.

16. The method of claim 1 wherein the assigning step comprises the step of receiving through the receiving step an adjustment or cancellation of the travel-related reservation and modifying the redeemable credits in response to the adjustment or cancellation of the travel-related reservation.

17. A computerized method for cumulatively assigning credits to persons who book travel-related reservations for use in receiving prizes or awards, comprising the steps executed by a computer of:
a) receiving an booking which includes information identifying a travel-related reservation, and an identification of a person who booked the travel-related reservation;
b) cumulatively assigning credits to the person who booked the travel-related reservation based upon the travel-related reservation; and
c) classifying the assigned credits based on predefined criteria, comprising the steps executed by the computer of:
i) classifying particular credits within the assigned credits as pending credits, which are not redeemable for a prize or award;
ii) classifying particular credits within the assigned credits as redeemable credits, which are redeemable for a prize or award; and
iii) changing classifications of particular credits within the assigned credits based on predetermined criteria related to the travel-related reservation.

18. The method of claim 17 wherein the receiving step comprises the step of receiving the booking and the identification of the person from a computerized reservation system.

19. The method of claim 17 wherein the receiving step comprises the step of receiving the booking the identification of the person from a modem connection.

20. The method of claim 17 wherein the receiving step comprises the step of receiving as the identification of the person a log-in identifier related to the person.

21. The method of claim 17, further comprising the step executed by the computer of reporting a total number of the credits assigned to the person.

22. The method of claim 21 wherein the reporting step comprises the step of reporting on-line the total number of the credits assigned to the person.

23. The method of claim 21 wherein the reporting step comprises the step of reporting in a hard copy format the total number of the credits assigned to the person.

24. The method of claim 21 wherein the reporting step comprises the step of reporting a total number of the pending credits assigned to the person.

25. The method of claim 21 wherein the reporting step comprises the step of reporting a total number of the redeemable credits assigned to the person.

26. The method of claim 17 wherein the assigning step comprises the step of assigning the credits to the person based upon a monetary value of the travel-related reservation.

27. The method of claim 17 wherein the assigning step comprises the step of displaying on-line an identification of whether the person has previously received credits.

28. The method of claim 17 wherein the assigning step comprises the step of assigning bonus credits, comprising additional credits, to the person based upon a predetermined activity in conjunction with the travel-related reservation.

29. The method of claim 17 wherein the assigning step comprises the step of receiving through the receiving step an adjustment or cancellation of the travel-related reservation and modifying the redeemable credits in response to the adjustment or cancellation of the travel-related reservation.

30. A computerized method for cumulatively assigning credits to persons who book travel-related reservations for use in receiving prizes or awards, comprising the steps executed by a computer of:

a) receiving an booking which includes information identifying a travel-related reservation, and an identification of a person who booked the travel-related reservation;

b) determining if the person has elected to receive the credits;

c) cumulatively assigning the credits to the person who booked the travel-related reservation based upon the travel-related reservation, if the person has elected to receive the credits; and d) determining, and reporting on-line an indication of, the credits which could have been assigned to the person, if the person did not elect to receive the credits.

31. The method of claim 30 wherein the receiving step comprises the step of receiving the booking and the identification of the person from a computerized reservation system.

32. The method of claim 30 wherein the receiving step comprises the step of receiving the booking the identification of the person from a modem connection.

33. The method of claim 30 wherein the receiving step comprises the step of receiving as the identification of the person a log-in identifier related to the person.

34. The method of claim 30, further comprising the step executed by the computer of reporting a total number of the credits assigned to the person.

35. The method of claim 34 wherein the reporting step comprises the step of reporting on-line the total number of the credits assigned to the person.

36. The method of claim 34 wherein the reporting step comprises the step of reporting in a hard copy format the total number of the credits assigned to the person.

37. The method of claim 30 wherein the assigning step comprises the step of assigning the credits to the person based upon a monetary value of the travel-related reservation.

38. The method of claim 30 wherein the assigning step comprises the step of displaying on-line an identification of whether the person has previously received credits.

39. The method of claim 30 wherein the assigning step comprises the step of assigning bonus credits, comprising additional credits, to the person based upon a predetermined activity in conjunction with the travel-related reservation.

40. The method of claim 30 wherein the assigning step comprises the step of receiving through the receiving step an adjustment or cancellation of the travel-related reservation and modifying the credits in response to the adjustment or cancellation of the travel-related reservation.

41. A computerized method for cumulatively assigning credits to persons who book travel-related reservations for use in receiving prizes or awards, comprising the steps executed by a computer of:

a) receiving an booking which includes information identifying a travel-related reservation, and an identification of a person who booked the travel-related reservation;

b) cumulatively assigning credits to the person who booked the travel-related reservation based upon the travel-related reservation, comprising the steps of:

i) calculating, based on predefined criteria related to the travel-related reservation, incremental credits to be assigned for the travel-related reservation; and ii) initially maintaining the incremental credits as pending credits, which are not redeemable for a prize or award; and c) automatically providing, in response to the booking, an indication of the incremental credits.

42. The method of claim 41, further comprising the steps executed by the computer of:

a) receiving an indication that the pending credits are to be converted to redeemable credits, which are redeemable for a prize or award; and b) changing the pending credits to redeemable credits.

43. The method of claim 41, further comprising the step executed by the computer of changing the pending credits after a predetermined amount of time to redeemable credits, which are redeemable for a prize or award.

* * * * *